Feb. 26, 1952
C. J. NAGEL
2,586,981
CONVEYER LOADER
Filed April 25, 1947
2 SHEETS—SHEET 1
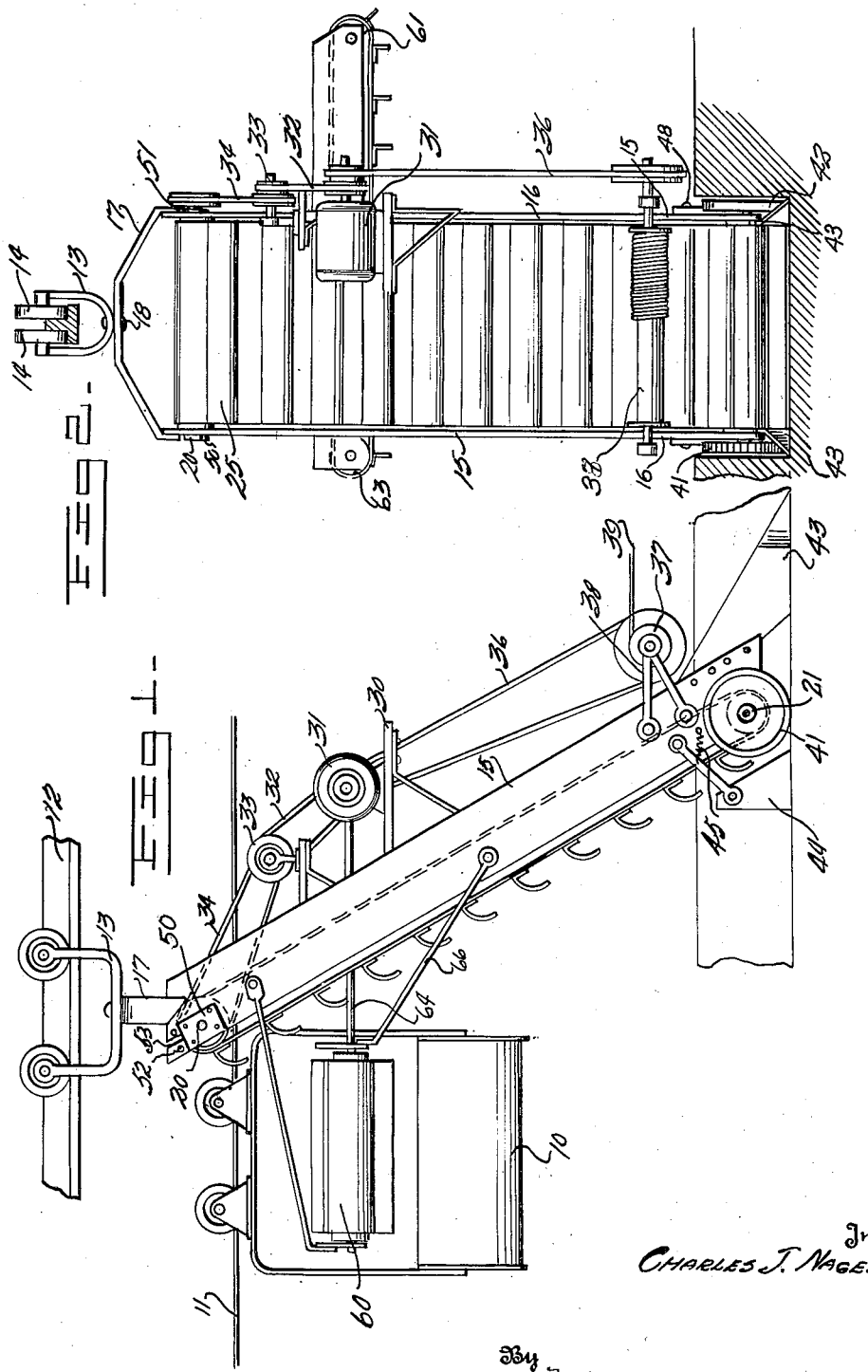
Inventor
CHARLES J. NAGEL
By McMorrow, Berman + Davidson
Attorneys

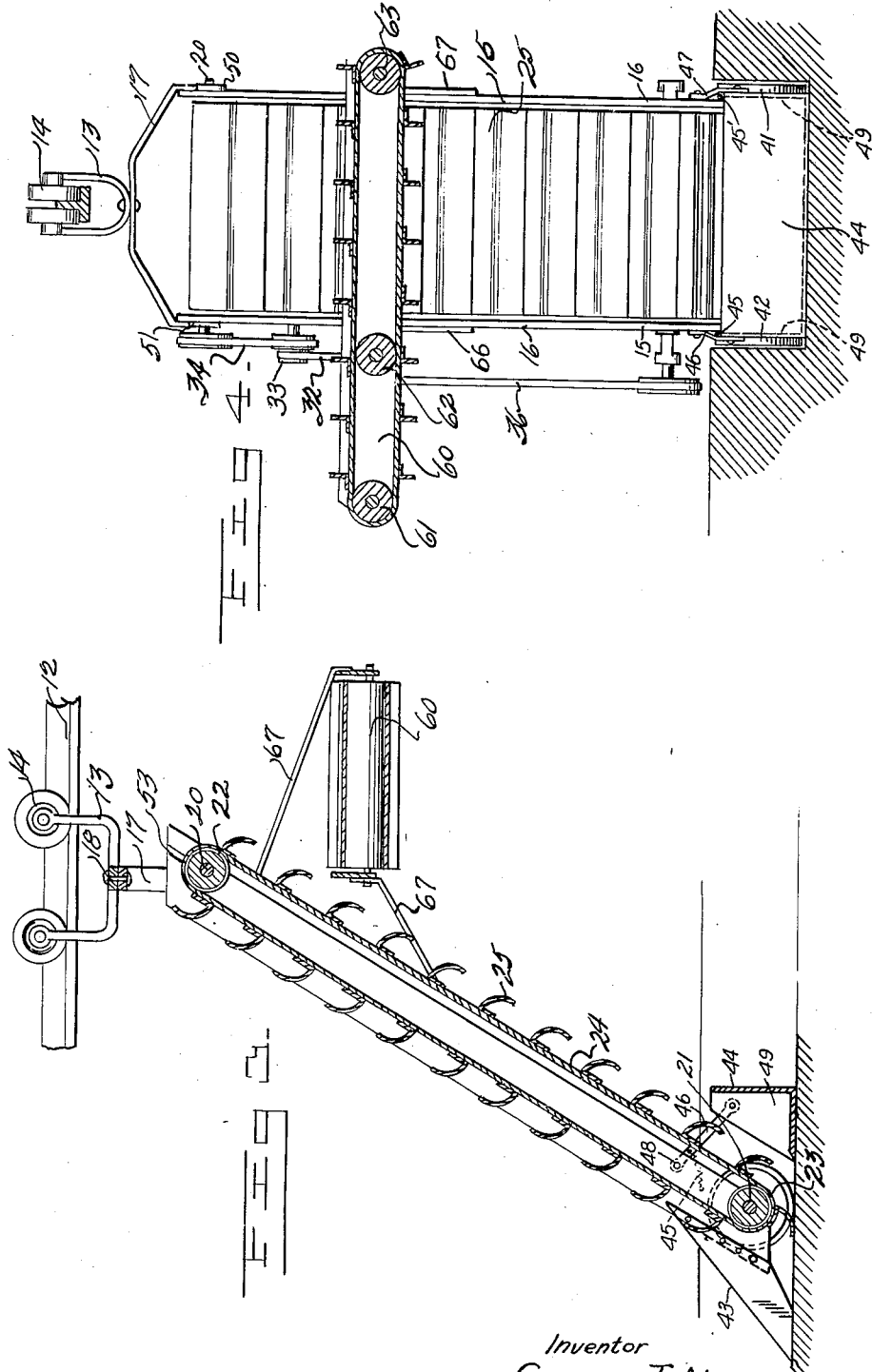

Patented Feb. 26, 1952

2,586,981

UNITED STATES PATENT OFFICE 2,586,981

CONVEYER LOADER

Charles J. Nagel, Evansville, Ind.

Application April 25, 1947, Serial No. 743,973

3 Claims. (Cl. 198—11)

This invention relates to loaders, and more particularly to an endless conveyor loader that is adapted to load farm material.

Farmers have a good deal of work in removing manure and similar material from their barns. Some barns are equipped with overhead rails, either single or double, on which a carrier is adapted to ride, and the farmer loads his material into this carrier. This, of course, is a great improvement over the previous methods of hand, bucket, or wheelbarrow. This invention is concerned with a loader for such a litter carrier.

The accompanying drawings illustrate a preferred embodiment of the invention, but it is understood that modifications may be made therein without departing from the spirit of the invention as hereinafter claimed.

In the drawings:

Figure 1 represents a side elevation of the new and improved loader, in conjunction with a litter carrier.

Figure 2 is a front view of the device of Figure 1, taken from the right of Figure 1.

Figure 3 is a longitudinal vertical section taken through the new and improved loader.

Figure 4 is a transverse vertical section taken through the loader.

Carrier 10, adapted for the carrying of manure and other litter, is shown suspended from a monorail 11. The loader that is the subject-matter of this invention is shown suspended from another monorail 12. The latter monorail 12 is shown in the form of an inverted T, but it is obvious that a rod form may be used, or that if desired the loader may operate on two rails instead of one. It should also be noted that whereas the roller of bogie 13 is shown as having two pairs of wheels 14, one pair may be sufficient, as that in fact only one wheel itself is all that is necessary. Further, the bogie 13 may run on the monorail 11 on which the carrier 10 runs.

The loader comprises two spaced upstanding vertical inclined side walls 15 and 16, which are joined at their tops by an upper frame 17. The upper frame 17 is pivotally attached to the bogie 13 by means of a pivot pin 18. A transverse shaft 20 is journaled in the side walls 15 and 16 near the upper ends thereof, and a similar shaft 21 is journaled at the lower ends of side walls 15 and 16. Fixed on the upper shaft 20 is a roller 22, and similarly fixed on the lower shaft 21 is a roller 23. The rollers 22 and 23 are provided with a friction pad with which to engage an endless conveyor or belt 24. A plurality of flights 25 is attached to the belt 24 in the usual manner to carry material upwardly on the top side of the belt 24.

A substantially horizontal platform 30 is attached to one of the side walls 16, and a gasoline or electric motor 31 is mounted on the platform 30. A transmission belt 32 is driven by the motor 31 to a pulley 33, and a second transmission belt 34 driven by the pulley 33 will actuate the upper roller 22 and thence the flights 25 on the conveyor belt 24. The pulley 33 acts as a speed control, but if desired, the pulley 33 may be omitted, and the control be effectuated at the motor 31 itself.

The same motor 31 may have another transmission belt 36 that actuates a drum 37, which is mounted on brackets 38 attached to the lower ends of the side walls 15 and 16. A cable 39 may be attached to a wall of the barn and wound on the drum 37 in such a manner that when the belt 36 is actuated by the motor 31, the cable 39 will be wound up on the drum 37. In this fashion, the loader may be made to approach the point to which the cable 39 is fastened.

A pair of traction wheels 41 and 42 are mounted on the outside of the side walls 15 and 16 at the bottoms thereof, and are freely rotatable. If the loader is designed to operate in a ditch or gutter of a particular size, the loader, of course, may be made of a size to fit that particular ditch or gutter, as is illustrated most clearly in Figure 2 of the drawings.

Positioned at the lower ends of side walls 15 and 16 adjacent the leading flight of the conveyor 24 and fixedly secured to the side walls are pusher members 43, which as the conveyor 24 is moved forward pushes the manure or other litter onto the flights 25 of the loader. Arranged between the lower end of the side walls 15 and 16 adjacent to and spaced from the trailing flight of the conveyor 24 and dependingly and pivotally connected to the side walls 15 and 16 is a scraper 44 which scrapes up any of the litter left by the pusher members 23. Specifically, the scraper 44 is attached to the side walls 15 and 16 by means of a pair of straps 46 and 47, which have their upper ends pivotally supported on a pin 48 carried in the side walls 15 and 16, the lower ends of the straps 46 and 47 being pivotally secured to the side walls 49 and 49' of the scraper 44. A spring means is operatively connected to the side wall 15 and the strap 46 and the side wall 16 and the strap 47 for biasing the scraper toward ground engaging position. Specifically, there is a spring 45 which has one end secured to the side wall 15 and has the other end secured to the strap 46 intermediate its ends, and a spring 45' which has one end secured to the side wall 16 and has the other end secured to the strap 47 intermediate its ends.

To provide for adjustment of the loader belt 24, the upper shaft 20 may be journaled in a pair of plates 50 and 51 that are relatively movable with respect to the side walls 15 and 16, respectively. This adjustment may be provided by means of a series of tap holes 52 in the side walls 15 and 16, to which the plates 50 and 51 may be secured by appropriate bolts. The upper portions of the side walls 15 and 16 will comprise longitudinal slots 53 to accommodate the movement of the shaft 20.

The litter may be dumped directly from the top of the loader into the carrier 10, and for this purpose the entire loader may be swung about the pivot 18 with which it is connected to the bogie 13. Preferably, however, the loader is provided with a transverse conveyor or chute 60. The conveyor 60 comprises a plurality of rollers 61, 62, and 63, one of which, 62, is driven directly by the motor 31 by means of a shaft 64, or indirectly by means of a belt and pulley. The conveyor is supported from the side walls 15 and 16 by means of suitable braces 66 and 67. These braces 66 and 67 may be adjustable with respect to the side walls 15 and 16 to vary the positioning of the conveyor 60 with respect to the loader. In the operation of the loader, the motor 31 is actuated to move the loader belt 24 to load and carry the litter on the flights 25. The loader may be pushed by hand, or preferably the cable 39 is wound on the drum 37 to move the loader in a desired direction. The pusher members 43 will channel the litter into the flights 25, and the scraper 44 will catch any material that is passed by the pusher members 43. The material is carried to the top of the loader and then dropped onto the transverse conveyor 60, whence it is deposited into the carrier 10. Of course, if the conveyor 60 is long enough, the material may be deposited outside the barn or any other location desired.

I claim:

1. A loader comprising a pair of spaced upstanding side walls arranged at an angle with respect to a ground surface and mounted for travel along said surface, an endless conveyor arranged longitudinally of and within said side walls and mounted therein for rotation about horizontal axes, a plurality of flights arranged transversely of said conveyor and spaced from each other and each having the trailing edge secured to the adjacent portion of said conveyor, pusher members at the lower ends of said side walls adjacent the leading flight of said conveyor and fixedly secured to said side walls for receiving and guiding the material to be loaded onto said flights, and a scraper arranged between the lower ends of said side walls adjacent to and spaced from the trailing flight of said conveyor and dependingly and pivotally connected to said side walls for gathering the material left behind by said pusher members in a pile contactable by the leading edge of said flights on the trailing flight of said conveyor.

2. A loader comprising a pair of spaced upstanding side walls arranged at an angle with respect to a ground surface and mounted for travel along said surface, an endless conveyor arranged longitudinally of and within said side walls and mounted therein for rotation about horizontal axes, a plurality of flights arranged transversely of said conveyor and spaced from each other and each having the trailing edge secured to the adjacent portion of said conveyor, pusher members at the lower ends of said side walls adjacent the leading flight of said conveyor and fixedly secured to said side walls for receiving and guiding the material to be loaded on to said flights, a scraper arranged between the lower ends of said side walls adjacent to and spaced from the trailing flight of said conveyor and dependingly and pivotally connected to said side walls for gathering the material left behind by said pusher members in a pile contactable by the leading edge of said flights on the trailing flight of said conveyor, and spring means operatively connected to said side walls and said scraper for biasing said scraper into engagement with said ground surface.

3. A loader comprising a pair of spaced upstanding side walls arranged at an angle with respect to a ground surface and mounted for travel along said surface, an endless conveyor arranged longitudinally of and within said side walls and mounted therein for rotation about horizontal axes, a plurality of flights arranged transversely of said conveyor and spaced from each other and each having the trailing edge secured to the adjacent portion of said conveyor, pusher members at the lower ends of said side walls adjacent the leading flight of said conveyor and fixedly secured to said side walls for receiving and guiding the material to be loaded onto said flights, a scraper arranged between the lower ends of said side walls adjacent to and spaced from the trailing flight of said conveyor and dependingly and pivotally connected to said side walls for gathering the material left behind by said pusher members in a pile contactable by the leading edge of said flights on the trailing flight of said conveyor, spring means operatively connected to said side walls and said scraper for biasing said scraper into engagement with said ground surface, and a rotatable horizontally disposed endless conveyor arranged transversely of said side walls adjacent to and spaced below the upper ends of said side walls for receiving the material discharged by said flights.

CHARLES J. NAGEL.

REFERENCES CITED

The following references are of record in the file of this patent:

UNITED STATES PATENTS

| Number | Name | Date |
| --- | --- | --- |
| 994,380 | Farrelly | June 6, 1911 |

FOREIGN PATENTS

| Number | Country | Date |
| --- | --- | --- |
| 333,903 | Great Britain | Aug. 22, 1930 |
| 385,862 | Germany | Nov. 30, 1923 |